US012681526B2

(12) United States Patent
Shao et al.

(10) Patent No.: US 12,681,526 B2
(45) Date of Patent: Jul. 14, 2026

(54) TIMING SYNCHRONIZATION SYSTEM

(71) Applicant: Skyworks Solutions, Inc., Irvine, CA (US)

(72) Inventors: Chengjia Shao, Austin, TX (US); Harihara Subramanian Ranganathan, Round Rock, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 147 days.

(21) Appl. No.: 18/381,858

(22) Filed: Oct. 19, 2023

(65) Prior Publication Data

US 2024/0137200 A1 Apr. 25, 2024
US 2024/0231418 A9 Jul. 11, 2024

Related U.S. Application Data

(60) Provisional application No. 63/380,203, filed on Oct. 19, 2022, provisional application No. 63/380,188, filed on Oct. 19, 2022, provisional application No. 63/380,208, filed on Oct. 19, 2022.

(51) Int. Cl.
G06F 1/14 (2006.01)
G06F 1/12 (2006.01)
H04J 3/06 (2006.01)
H04L 7/04 (2006.01)

(52) U.S. Cl.
CPC .................. *G06F 1/14* (2013.01); *G06F 1/12* (2013.01); *H04J 3/0667* (2013.01); *H04L 7/04* (2013.01)

(58) Field of Classification Search
CPC .. G06F 1/14; G06F 1/12; H04J 3/0667; H04L 7/04
See application file for complete search history.

(56) References Cited

U.S. PATENT DOCUMENTS

| | | | |
|---|---|---|---|
| 5,041,798 A | 8/1991 | Moorman et al. | |
| 6,675,307 B1 | 1/2004 | Heitkamp et al. | |
| 8,654,823 B1 | 2/2014 | Zhu et al. | |
| 9,698,808 B1 | 7/2017 | Meninger et al. | |
| 10,084,559 B1 | 9/2018 | Devineni et al. | |
| 2012/0311372 A1 | 12/2012 | Iijima | |
| 2013/0013878 A1 | 1/2013 | Frans et al. | |
| 2014/0133613 A1 | 5/2014 | Kumar et al. | |
| 2019/0273571 A1 | 9/2019 | Bordogna et al. | |
| 2021/0203428 A1 | 7/2021 | Bordogna et al. | |
| 2023/0006676 A1* | 1/2023 | Laslo | H03L 7/08 |
| 2023/0269063 A1 | 8/2023 | Dror | |

(Continued)

OTHER PUBLICATIONS

Lipinski et al., "White rabbit: a PTP application for robust sub-nanosecond synchronization", IEEE, 2011.

(Continued)

*Primary Examiner* — Elton Williams
(74) *Attorney, Agent, or Firm* — Knobbe, Martens, Olson & Bear, LLP

(57) ABSTRACT

Clocking systems are disclosed. A clocking system can include first and second clock domains. Each clock domain can include circuitry with a counter. The clocking system can measure timing errors between these two domains by measuring a phase difference and determining a residual error. Based on the measured timing error, the clocking system can synchronize the time in the first and second clock domains by using at least one of the counters.

20 Claims, 8 Drawing Sheets

(56)        References Cited

U.S. PATENT DOCUMENTS

| | | |
|---|---|---|
| 2024/0007213 A1 | 1/2024 | Ozyurt et al. |
| 2024/0134411 A1 | 4/2024 | Shao et al. |
| 2024/0137201 A1 | 4/2024 | Shao et al. |

OTHER PUBLICATIONS

Si5518 Data Short, "NetSync™ Low-Phase-Noise Jitter-Attenuating Clock for 5G/eCPRI/SyncE/IEEE 1588", Skyworks Solutions, Inc., Jul. 28, 2022.
"Si550 Revision D, Voltage-Controlled Crystal Oscillator (VCXO) 10 MHz to 1.4 GHz", Skyworks Solutions, Inc., Mar. 4, 2022.
"Ultra Series™ Crystal Oscillator Si540 Data Sheet", Skyworks Solutions, Inc., May 26, 2023.

* cited by examiner

THE COUNTER VALUES MATCH WHEN
T = LCM (Tclk1, Tclk2)

TIMING SYNCHRONIZATION SYSTEM

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority of U.S. Provisional Patent Application No. 63/380,188, filed Oct. 19, 2022, and titled "Flexible Precision Time Protocol System," U.S. Provisional Patent Application No. 63/380,208, filed Oct. 19, 2022 and titled "Timing Synchronization System with Error Measurement," and U.S. Provisional Patent Application No. 63/380,203, filed Oct. 19, 2022, and titled "Timing Synchronization System," the disclosures of each of which are hereby incorporated by reference in their entireties and for all purposes.

BACKGROUND

Technical Field

Embodiments of this disclosure relate to timing synchronization systems and related methods.

Description of Related Technology

Network timing synchronization systems can be used in a variety of applications. For example, a network timing synchronization system can be integrated into a wireless communication system or any network system. Each device within a network can be synchronized to a reference time, such as a timestamp received from a master network device or a global positioning system (GPS). To synchronize the time for the network devices, a timing synchronization system based on a timing synchronization protocol, such as a precision time protocol (PTP), can provide timing synchronization within the network. The timing synchronization system can be integrated into the network work device. The timing synchronization can involve adjusting the network device's time of day (e.g., the network device's time) to synchronize with the timestamp received from the master network device or the GPS. For example, the network timing synchronization system can receive a data packet that includes a Time of Day (ToD) timestamp, a reference time, from the master network device. The network timing synchronization system can identify the ToD timestamp and determine the time difference between the network device's ToD and the received ToD timestamp from the master network device. Then, the network timing synchronization system can synchronize its ToD to the received ToD timestamp utilizing a reference clock.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a clocking system. The clocking system includes first clock domain circuitry, including a first Time of Day counter, and second clock domain circuitry, including a second counter. The second clock domain circuitry is configured to apply a phase adjustment signal indicative of a difference between an error measurement and a residual measured in the second counter to reduce mismatch between outputs of the first Time of Day counter and the second counter. The error measurement represents a phase difference between the outputs of the first Time of Day counter and the second counter.

The first Time of Day counter of the clocking system can have a fixed increment. The second counter can also have an adjustable increment. Additionally, the first clock domain circuitry can generate a first clock signal having an adjustable frequency for the first Time of Day counter. Furthermore, the second clock domain circuitry can generate a second clock signal having a fixed frequency for the second counter. The first clock domain circuitry can also generate a first clock signal, and the second clock domain circuitry can generate a second clock signal. The second clock signal can have a different frequency than the first clock signal.

The first Time of Day counter of the clocking system can be included in a system clock domain. The second counter can be included in a Synchronous Ethernet clock domain. Additionally, the second counter can be included in a physical layer clock domain.

The second counter of the clocking system can be included in a physical layer clock domain. The second clock domain circuitry can connect to an Ethernet port.

The first Time of Day counter of the clocking system can receive a first reference clock signal, and the second counter can receive a second reference clock signal having a different frequency than the first reference clock signal.

The clocking system can further include an error measurement circuit that can receive a first phase indicator from the first Time of Day counter and a second phase indicator from the second counter. The error measurement circuit can provide an output signal indicative of the error measurement. Additionally, the second clock domain circuitry can determine the residual measured in the second counter.

The first clock domain circuitry of the clocking system can include a timestamp filter. The timestamp filter can determine a Time of Day from a packet received via an Ethernet port. The first clock domain circuitry of the clocking system can include a proportional-integral-derivative controller having an input connected to an output of the timestamp filter. The first clock domain circuitry can also include a reference clock generator having an input connected to an output of the proportional-integral-derivative controller and an output connected to the first Time of Day counter.

The first clock domain circuitry of the clocking system can include a first reference clock generator, and the second clock domain circuitry can include a second reference clock generator.

Another aspect of this disclosure is a network device. The network device includes the above clocking system and a port for connecting to a second network device. The clocking system is configured to process a Time of Day timestamp received from the second network device at the port.

The port of the network device can be an Ethernet port.

The network device can further include a switch coupled between the port and the first clock domain circuitry.

Another aspect of this disclosure is a method of Time of Day synchronization. The method includes receiving a Time of Day timestamp from a master network device and synchronizing outputs of a first Time of Day counter in a first clock domain and a second counter in a second clock domain with Time of Day timestamp based on (i) an error measurement representing a phase difference between outputs of the first Time of Day counter and the second counter and (ii) a residual measured in the second counter.

Another aspect of this disclosure is a method of timing synchronization. The method includes receiving a first phase indicator from a first clock domain of a network device and a second phase indicator from a second clock domain of the network device and generating a phase measurement based on the first phase indicator and the second indicator.

The method can further include adjusting a Time of Day of the second clock domain based on the phase measurement.

The method can further include determining a residual measured in a counter that can output a Time of Day of the second clock domain. Additionally, the method can further include adjusting the Time of Day of the second clock domain based on the phase measurement and the residual.

In the method, the first clock domain can be a system clock domain, and the second clock domain can be a physical layer clock domain.

In the method, the first clock domain can include a first Time of Day counter having a fixed increment and can output a first Time of Day, and the second clock domain can include a second counter having an adjustable increment and can output a second Time of Day.

Additionally, the first Time of Day counter can receive a first reference clock signal having an adjustable frequency, and the second counter can receive a second reference clock signal having a fixed frequency.

The method can further include determining, in the first clock domain, a Time of Day timestamp from packet received from a master network device at a port of the network device. The port can be an Ethernet port. Additionally, the method can further include generating, in the first clock domain, a first Time of Day based on the Time of Day timestamp.

In the method, the generation can be performed by an integrated circuit that includes a first input contact connected to circuitry of the first clock domain and a second input contact connected to circuitry of the second clock domain.

Another aspect of this disclosure is an error measurement circuit. The error measurement circuit includes a first input node configured to receive a first phase indicator from a first clock domain of a network device, a second input node configured to receive a second phase indicator from a second clock domain of the network device, and an output node configured to provide an error signal indicative of a phase measurement that is based on the first phase indicator and the second phase indicator.

The error measurement circuit of the error measurement circuit can be included in an integrated circuit having a first input contact and a second input contact. The first input node can be at the first input contact, and the second input node can be at the second input contact.

The integrated circuit of the error measurement circuit can include a circuit having a frequency in a range from 8 gigahertz to 12 gigahertz.

The error measurement circuit can determine a difference between the first phase indicator and the second phase indicator to an accuracy within 100 picoseconds.

Another aspect of this disclosure is a network device. The network device includes a port for connecting with a second network device, first clock domain circuitry operatively connected to the port, a second clock domain circuitry including a second counter, and an error measurement circuit in communication with the first clock domain circuitry and the second clock domain circuitry. The first clock domain circuitry includes a first Time of Day counter. The second clock domain circuitry is configured to reduce mismatch between outputs of the first Time of Day counter and the second counter based on an error signal indicative of a phase measurement of mismatch between the output of the first Time of Day counter and the second counter. The error measurement circuit is configured to generate the error signal.

The port in the network device can be an Ethernet port.

The first Time of Day counter in the network device can have a fixed increment, and the second counter can have an adjustable increment.

The first clock domain circuitry in the network device can be a system clock domain circuitry, and the second clock domain circuitry can be a physical layer clock domain circuitry.

The first clock domain circuitry in the network device can be a system clock domain circuitry, and the second clock domain circuitry can be a Synchronous Ethernet clock domain circuitry.

Another aspect of this disclosure is a method of clock domain timing synchronization. The method includes receiving a Time of Day timestamp from a master network device, adjusting clock period in a first clock domain of a slave network device such that a first Time of Day Counter output is synchronized to the Time of Day timestamp, and synchronizing an output of a second Time of Day counter in a second clock domain of the slave network device to the output of the first Time of Day counter based on (1) an error measurement representing a phase difference between outputs of the first and second Time of Day counters and (2) a residual measured in the second Time of Day counter.

In the method, synchronizing the output of the second Time of Day counter can include adjusting an increment value of the second Time of Day counter. Additionally, a state machine can determine the increment value of the second Time of Day counter, and the second Time of Day counter can receive a clock signal having a fixed frequency.

Additionally, the first Time of Day counter can have a fixed increment value. Furthermore, the second Time of Day counter can receive a clock signal having a fixed frequency.

In the method, the first Time of Day counter and the second Time of Day counter can receive different clock signals having different respective frequencies.

In the method, the first clock domain can be a system domain, and the second clock domain can be a physical layer domain.

In the method, the receiving can be performed by using an Ethernet port of the slave network device.

The method can further include generating the error measurement with an error measurement circuit that is on an integrated circuit. The integrated circuit can have a first input contact configured to receive a phase indicator from the first Time of Day counter and a second input contact configured to receive a phase indicator from the second Time of Day counter.

The method can further include determining the Time of Day from a packet received from the master network device using a timestamp filter.

Another aspect of this disclosure is a network device. The network device includes a port configured to receive a Time of Day timestamp from a master network device, first clock domain circuitry including a first Time of Day counter and a reference clock generator, and second clock domain circuitry. The reference clock generator is configured to adjust a reference clock signal based on the Time of Day timestamp to synchronize an output of the first Time of Day counter output to the Time of Day timestamp. The second clock domain circuitry includes a second Time of Day counter and a state machine. The state machine is configured to synchronize an output of the second time of Day counter to the output of the first Time of Day counter based on (1) an error measurement representing a phase difference between outputs of the first and second Time of Day counters and (2) a residual measured in the second Time of Day counter.

The state machine of the network device can adjust an increment value of the second Time of Day counter based on the error measurement and the residual.

The first Time of Day counter of the network device can have a fixed increment value.

The second clock domain circuitry of the network device can include a second reference clock generator. The second reference clock generator can generate a second reference clock signal having a fixed frequency, and the second Time of Day counter can receive the second reference clock signal.

The second clock domain circuitry of the network device can include a second reference clock generator. The second reference clock generator can generate a second reference clock signal having a different frequency than the reference clock signal.

The network device can further include an error measurement circuit configured to generate the error measurement. The error measurement circuit can be integrated into an integrated circuit. The integrated circuit can include a first input contact configured to receive an indication of phase of the output of the first Time of Day counter and a second input contact configured to receive an indication of phase of the output of the second Time of Day counter.

The port of the network device can be an Ethernet port.

The first clock domain circuitry of the network device can include a timestamp filter. The timestamp filter can determine the Time of Day timestamp from a packet received from the master network device at the port.

Another aspect of this disclosure is a clocking system. The clocking system includes first clock domain circuitry and second clock domain circuitry. The first clock domain circuitry includes a first Time of Day counter and a reference clock generator. The reference clock generator is configured to adjust a reference clock signal based on a Time of Day timestamp to synchronize an output of the first Time of Day counter output to the Time of Day timestamp. The second clock domain circuitry includes a second Time of Day counter and a state machine. The state machine is configured to synchronize an output of the second time of Day counter to the output of the first Time of Day counter based on (1) an error measurement representing a phase difference between outputs of the first and second Time of Day counters and (2) a residual measured in the second Time of Day counter.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
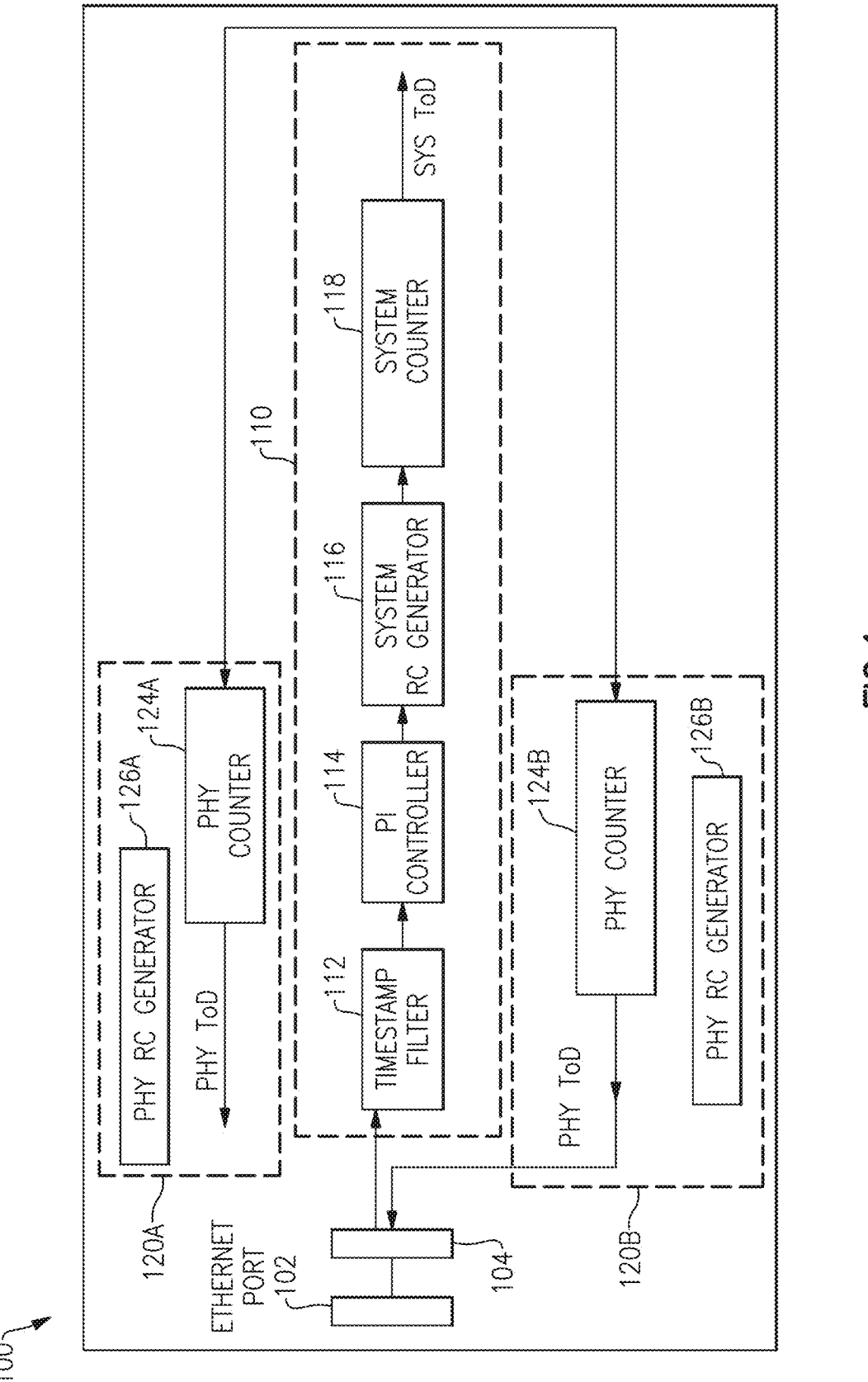
FIG. 1 is an example of a block diagram for a flexible precision time protocol system.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. Any suitable principles and advantages of the embodiments disclosed herein can be implemented together with each other.

As the demand for network communication increases, a timing synchronization system for synchronizing an accurate time throughout the network is desired. For example, as the demand for network communication increases, a number of network devices and/or nodes within a network and the coverage area of the network can be increased. Accurate timing synchronization for these network devices and/or nodes within the network is desired. In addition, the network may utilize various frequency bands, including high frequency bands. For example, the network may include a plurality of network devices and/or nodes configured to transmit and receive data at a high bit rate, such as a gigabit rate. In this example, the network may utilize high frequency bands to process and transfer data at the high bit rate. Thus, an accurate timing synchronization across the network devices and/or nodes is desired to support the data transfer at the high bit rate.

The timing synchronization system can use one or more timing synchronization protocols, such as a precision time protocol (PTP). The network can include Ethernet-based networks and/or wireless communication networks. In the context of a network utilizing high frequency bands, such as frequency bands used in 5G applications, the network can implement one or more of lower latency, faster speed, higher frequency ranges, shorter wavelengths, or a higher number of network devices than other networks, such as networks in a fourth generation (4G) applications. Thus, the accuracy of the timing synchronization across a network that uses high frequency bands for data transfer can be a significant factor in network performance.

Aspects of this disclosure relate to synchronizing a Time of Day (ToD) in different clock domains of a network device. The network device can include first clock domain circuitry and second clock domain circuitry. The first clock domain circuitry can include a first ToD counter. The first ToD counter can have a fixed increment and receive a first reference clock signal having an adjustable frequency. The first clock domain circuitry can synchronize its ToD with a ToD timestamp in a packet received at a port of the network device. The port can be an Ethernet port. The second clock domain circuitry can include a second ToD counter. The second ToD counter can have an adjustable increment and receive a second reference clock signal having a generally fixed frequency. Outputs of the first and second ToD counters can be synchronized based on (1) a measurement of phase difference between the outputs of these counters and (2) a residual in the second ToD counter. The synchronization can involve adjusting the increment of the second ToD counter. An error measurement circuit can generate the measurement of phase difference. Network devices disclosed herein can include more than one clock domain with little error between respective ToDs in the clock domains. For example, timing synchronization disclosed herein can implement precision time protocols.

Certain approaches for precise timing synchronization across a network have focused on updating a clock signal of a network device by utilizing a specific type of protocol, such as a precision time protocol (PTP). For example, a network device may receive a data packet, including a time of day (ToD) timestamp from a master network device, which can be a network device configured to distribute a reference clock signal across the network. Generally, the network device that receives a ToD timestamp from the master network device can be referred to as a slave network device. In this example, the slave network device can determine a time difference with the master network device by comparing the slave network device's own ToD with the ToD timestamp received from the master network device. Thus, the slave network device can synchronize its ToD with the ToD timestamp received from the master network device. For example, the slave network device can synchronize its ToD with the master network device based on adjusting the modulation frequency of the slave network device. However, utilizing such an approach can generate timing synchronization errors due to data (e.g., ToD timestamp) communication across domains, such as the system and physical domains. For example, a physical domain of a network device may receive a ToD timestamp from a master network device and transfer the received ToD timestamp to the system domain. In this example, the network device's ToD can be synchronized with the ToD timestamp in the system domain, where the network device system uses the synchronized ToD as a reference time of the system. The network device can also include a physical layer (PHY) domain, which can be a Synchronous Ethernet (SyncE) domain. The error can generate a time difference between the system domain and the PHY domain within a network device. This can cause a timing synchronization error within the network device.

In another approach for precise timing synchronization, a PTP phase lock loop (PLL) can be utilized to synchronize a PHY ToD (e.g., a SyncE domain ToD). In this approach, the ToD of the slave network device can be synchronized with the master network device's ToD in the PHY domain. For example, the PTP PLL may provide a reference clock (RC), and the RC may update the PHY ToD to synchronize with the ToD timestamp received from the master network device. However, this approach is typically used in congruent full timing support (FTS) system, where the network devices within a network have the same precision reference clock in the system domain and PHY domain. Thus, if the reference clock in the system domain and PHY domain is different, this approach is not expected to work.

This disclosure provides technical solutions for precise timing synchronization in a network to be used for network devices that include various types of FTS systems. Systems and methods for precision timing synchronization in network devices are provided, including a congruent FTS system or a non-congruent FTS system. For example, the systems and methods disclosed herein can provide a precision timing synchronization for a network device with different reference clocks in the system domain and in the PHY domain, which can generally be referred to as a non-congruent FTS system. These different domains can be different clock domains. Examples of network devices include, but are not limited to, mobile phones, tablets, base stations, network access points, customer-premises equipment (CPE), laptops, and wearable electronics.

Network devices disclosed herein can include a system domain and a physical layer domain (a PHY domain). The ToD timestamp received from a master network device can be distributed to the PHY domain. The network device may also synchronize its reference ToD to the ToD timestamp in the system domain. Thus, the network device can have two different reference ToDs in the system domain and the PHY domain. The reference ToD in the system domain can be referred to as a SYS ToD and the reference ToD in the PHY domain can be referred to as a PHY ToD. The PHY ToD can be synchronized to and SYS ToD in a network device in accordance with any suitable principles and advantages disclosed herein.

One or more embodiments of the present disclosure are related to systems and methods for synchronizing a precise time and phase of network devices by utilizing a flexible PTP system. The flexible PTP system can include a system domain and a PHY domain. The system and PHY domains can have different reference clocks (RCs). For example, the network device can include reference clocks in both the system and PHY domains. These domains can be different clock domains. The RCs are each configured to provide a reference clock signal to a ToD counter in the same domain. In the system domain, adjusting the RC can synchronize the SYS ToD to the ToD timestamp received from the network device. In the PHY domain, an increment value for the PHY ToD counter can be adjusted to synchronize the PHY ToD to the SYS ToD.

The timing synchronization with the ToD timestamp received from the master network device can be performed by controlling one or more counter increment values and/or modulation frequency of one or more RCs. For example, the SYS ToD can be adjusted by changing the corresponding RC's modulation frequency in the system domain. The PHY counter increment value can be adjusted (e.g., increased or decreased) to synchronize the PHY ToD to the SYS ToD. Thus, one or more embodiments of the present disclosure can provide precision timing synchronization in various types of FTS systems. The FTS system, for example, can be a congruent FTS when the system and PHY domains have the same RC or a non-congruent FTS when the system and PHY domains have different RCs. Aspects of this disclosure can be implemented in non-congruent FTS. These are merely provided as examples, and any suitable principles and advantages disclosed herein can be applied to any suitable network that uses the PTP system.

One or more embodiments of the present disclosure are related to the system and methods for calculating an actual error between ToDs in different clock domains. The actual error can cause a ToD mismatch between the master network device and the slave network device. The actual error can be generated due to data exchange between the system and PHY domains. For example, the SYS ToD can be transferred to the PHY domain, and this transfer can be a dominant source of the actual error in certain applications. The flexible PTP system can be used to precisely synchronize the ToD of the network device by calculating the actual error and synchronizing the PHY ToD to the SYS ToD in the PHY domain of the network device. This can also provide a precision timing synchronization with the ToD timestamp of the master network device based on the actual calculated error. One or more embodiments of the flexible PTP systems can be related to detecting an actual error based on a SYS phase indicator and PHY phase indicator. For example, the flexible PTP system can include an error measurement circuit. In this example, the error measurement circuit can determine time or phase error between the PHY phase indicator and the SYS phase indicator. If there is an actual error, the counter increment value for the PHY ToD counter can be adjusted to compensate for the actual error.

FIG. 1 is a block diagram of a flexible PTP system 100 implemented in a network device. The flexible precision time protocol (PTP) system 100 can include a system domain 110. The system domain 110 includes circuitry in a system clock domain. The system domain 110 can be configured to provide a reference time (Time of Day (ToD) in the system domain) to the network device that includes the flexible PTP system 100. The system domain 110 can also be configured to synchronize the reference time with the ToD timestamp received from the master device, which can be a reference time received from the master device. For example, the master device may transmit a data packet that includes the ToD timestamp, and the system domain 110 may receive the data packet and process it to identify the ToD timestamp. Additionally, the system domain 110 may determine a time difference between the reference time of the system and the timestamp ToD received from the master device. In response to determining the time difference, the system domain 110 can be configured to synchronize its reference time with the timestamp ToD received from the master device according to one or more embodiments, as disclosed herein.

The flexible PTP system 100 can also include a PHY domain 120. The PHY domain 120 can be a Synchronous Ethernet (SyncE) domain, for example. The PHY domain 120 is a different clock domain than the system domain 110. The PHY domain 120 includes circuitry in a PHY clock domain. The PHY domain 120 can include two portions 120A and 120B that are collectively referred to as PHY domain 120. One of these portions can be for transmit and one can be for receive. The PHY domain 120 can be configured to distribute the reference time of the network device that includes the flexible PTP system 100 to one or more other network devices. The PHY domain 120 is implemented in a physical layer of the network device. For example, the reference time (e.g., ToD in system domain) can be transferred to the PHY domain 120 (e.g., the physical layer of the network device), and the transferred reference time can be distributed to one or more other network devices.

The flexible PTP system 100 can also be configured to detect and compensate for an error, such as a time difference between the system domain 110 and the PHY domain 120. More specifically, the ToD in the PHY domain 120 can be synchronized to the ToD in the system domain 110. For example, the reference time in the system domain 110 can be synchronized with the ToD timestamp received from the master device. Then, the synchronized time can be transferred to the PHY domain 120, and a time difference can be generated associated with the transfer. The flexible PTP system 100 can be configured to detect the time difference by comparing phase indicator signals generated in the system domain 110 and the PHY domain 120. The flexible PTP system 100 can compare these two phase indicators to detect the time difference between ToDs in these clock domains.

The flexible PTP system 100 of FIG. 1 shows example embodiments of synchronizing a network device's reference time in both of the system and PHY domains by utilizing system domain 110 and PHY domain 120. In the system domain 110, the network device's system clock (e.g., reference time of the network device) can be synchronized with the ToD timestamp received from a master network device by utilizing a system reference clock (RC) generator 116. The system RC generator 116 can include a phase-locked loop. The system RC generator 116 can be configured to provide a reference clock signal. For example, the system RC generator 116 may provide a reference clock signal to synchronize the ToD of the network device in the system domain 110 by changing the clock frequency of the system RC. The synchronized ToD in the system domain 110 can be transferred to a PHY domain 120. Then the PHY ToD can be synchronized to the SYS ToD in the PHY domain 120. This timing synchronization of the network device in both the system domain 110 and PHY domain 120 can provide more accurate timing synchronization by reducing and/or minimizing the time or phase error that can be caused in transferring the SYS ToD to the PHY domain 120. Thus, the flexible PTP system 100 can perform timing synchronization in both the system domain 110 and the PHY domain 120 to precisely synchronize the ToD with the master network device's ToD. One or more circuits in FIG. 1 can be included on an application-specific integrated circuit (ASIC).

As shown in FIG. 1, the flexible PTP system 100 can receive a ToD timestamp from a master network device via an ethernet port 102. The flexible PTP system 100 can include system domain 110 and the PHY domain 120. The PHY domain portions 120A and 120B can have similar or identical circuitry to each other. The PHY portion 120A can be used for receive and the PHY portion 120B can be used for transmit. The flexible PTP system 100 can include a switch 104 configured to select to receive the ToD from the master device or to distribute a ToD of the network device to one or more other network devices. For example, a switch 104 can be in a receive mode, and the flexible PTP system 100 can receive the ToD timestamp from the master network device. In another example, the switch 104 can be in a distribute mode, and the flexible PTP system 100 can distribute it ToD to one or more other network devices. The received ToD timestamp from the master network device can be provided to the system domain 110. The system domain 110 can include circuitry that synchronizes the ToD in the system domain (e.g., ToD timestamp in the system domain) with a master ToD timestamp received from a master network device.

The flexible PTP system 100 can also distribute its ToD to one or more other network devices. For example, a timestamp of the PHY ToD or the SYS ToD can be distributed to one or more other network devices via the ethernet port 102. In this example, the network device, including the flexible PTP system 100 can be a master network device, and the other network device can be a slave network device. In some embodiments, the flexible PTP system 100, after synchronizing the counters in the system domain 110 and PHY domain 120, the synchronized counter output can be distributed to one or more other network devices via the ethernet port 102.

As illustrated, the system domain 110 can include a timestamp filter 112, a proportional-integral (PI) controller 114, a system RC generator 116, and a system counter 118. The system domain 110 may utilize a PTP for timing synchronization with the ToD of the master network device. The system counter 118 can also be referred to as a PTP counter.

The timestamp filter 112 can identify a ToD timestamp from data received from the master network device. Based on the PTP, the master network device can periodically transmit a message in the form of a data packet to the slave network device. This message can be generally referred to as a synchronization message. The synchronization message can include a ToD timestamp of the master network device. For example, the master network device can transmit a synchronization message for about every 100 ms, and the synchronization message can include the ToD of the master network device. The timestamp filter 112 can be configured to identify the ToD of the master network device by filtering the synchronization message. For example, if the synchronization message is a 32 bit data packet, the timestamp filter 112 filters the data packet and identifies the ToD of the master network device.

The PI controller 114 can calculate a time difference between the master network device and the slave network device. For example, the PI controller 114 can compare the ToD of the slave network device or an indication thereof with the identified ToD timestamp of the master network device. The PI controller 114 may generate feedback, such as a proportional control feedback and integral control feedback. The proportional control feedback can represent the time difference ToD of the master network device and the ToD of the slave network device. The integral control feedback can represent an error generated by the flexible PTP system 100. For example, the flexible PTP system 100 may have an internal time delay caused by data communication between components, such as between the ethernet port 102 and the system domain 110 or caused by processing the received synchronization message. Based on this feedback, the PI controller 114 can calculate the time difference between the master network device and the slave network device. Any other suitable controller can be implemented in place of the PI controller 114. In certain instances, the PI controller 114 can be a proportional-integral-derivative (PID) controller.

The system RC generator 116 can generate a reference time clock signal to synchronize the ToD of the slave network device with the ToD of the master network device. The system RC generator 116 can provide a reference clock signal to the system ToD counter 118. The system ToD counter 118 can synchronize with ToD of the master network device by utilizing an output of the system RC generator 116.

The clock frequency of the system RC generator 116 can be controlled based on the difference between ToD of the master network device and the SYS ToD of the slave network device. The system RC generator 116 may utilize the time difference determined by the PI controller 114 to control the clock frequency. For example, if the ToD of the slave network device is slower than the ToD of the master network device, the clock speed of the system RC can be increased. As another example, if the ToD of the slave network device is faster than the ToD of the master network device, the clock speed of the system RC can be decreased.

The system RC generator 116 can control its clock frequency so as to synchronize the output the system ToD counter 118 with the ToD timestamp received by the Ethernet port 102. If there is a difference between the ToD of the system domain 110 and the ToD of the master network device, the clock frequency of the system RC generator 116 can be adjusted.

The system counter 118 can synchronize the ToD in the system domain 110 and generate a SYS ToD. The SYS ToD is an output of the system counter 118. The system counter 118 can be referred to as a ToD counter. The SYS ToD can be an 80-bit signal, for example. The timing synchronization in the system domain 110 can be based on changing the reference clock frequency of the system RC generator 116, as described in the above. The SYS ToD can be transferred to a PHY domain 120 and/or distributed to other network devices.

As illustrated in FIG. 1, the PHY domain portions 120A, 120B can each include a PHY counter 124A or 124B and a PHY RC generator 126A or 126B. The PHY counters 124A and 124B can implement the same or similar functionality and will collectively be referred to as the PHY counter 124 in this description. The PHY RC generators 126A and 126B can implement the same or similar functionality and will collectively be referred to as the RC generator 126 in this description. The PHY counter 124 and a PHY RC generator 126 in the PHY domain portions 120A, 120B can be identical or different components based on specific application. In some instances, the flexible PTP system 100 can include a single PHY domain 120A. The PHY counter 124 can generate and output a PHY ToD in PHY domain 120. The PHY RC generator 126 can provide a reference clock. The PHY RC generator 126 can include a phased lock loop. The PHY domain portions 120A, 120B can have the same or similar circuitries. The PHY domain 120 can be configured to receive the SYS ToD. The PHY domain 120 can transmit the PHY ToD to one or more other network devices. The PHY counter 124 can be referred to as a PHY ToD counter. The PHY ToD can be distributed to one or more other network devices via the ethernet port 102. In this example, the network device, including the flexible PTP system 100 can be operated as a master device that can distribute its reference time to one or more other network devices.

In some embodiments, an error, such as a ToD difference between the system domain 110 and the PHY domain 120 can be generated. For example, the system counter 118 may synchronize the SYS ToD with the ToD received from a master network device in the system domain 110 by adjusting the reference clock frequency generated from the system RC generator 116. However, the reference clock frequency in the PHY domain 120 can be different from the reference clock frequency in the system domain 110 and the PHY counter 124 may not have direct information on the speed of the system counter 118. This difference in reference clock frequency can result in the ToD difference in these domains. The flexible PTP system 100 can be configured to detect the error and compensate for the error. For example, the flexible PTP system 100 can be configured to generate a SYS phase indicator and a PHY phase indicator. The flexible PTP system 100 may compare the SYS phase indicator with the PHY phase indicator to determine the error. The flexible PTP system 100 can compensate for the error by synchronizing the PHY ToD to the SYS ToD. For example, the PHY counter 124 can adjust its counter increment value to synchronize the PHY ToD with the SYS ToD. To detect and compensate the error, the flexible PTP system 100 may include additional components or circuitry in addition to the example shown in FIG. 1.

In some instances, the clock frequencies in the system RC generator 116 and the PHY RC generator 126 can be different, and the PHY counter 124 may add a counter increment value to synchronize the PHY ToD with the SYS ToD. The PHY RC generator 126 may provide a reference clock frequency to the PHY counter 124. The PHY RC generator 126 can have a fixed frequency. For example, the PHY counter 124 may adjust its counter increment value to synchronize with the SYS ToD without changing its frequency. For example, the PHY RC generator 126 can provide a reference clock signal, and the PHY counter 124 can have an initial counter increment value that increases corresponding to each period of the PHY RC generator 126. In this example, if the PHY RC has a period 6.5 nanoseconds (ns), the ToD counter value of 6.5 can be added for every 6.5 ns. The PHY counter 124 may adjust its ToD counter increment value to synchronize with the counter value of the SYS ToD. For example, if the initial ToD in the PHY domain 120, can have an increment value of 6.5, increasing for every 6.5 ns, the PHY counter 124 may adjust the increment value to 6.3. Thus, the increment value of 6.3 can be added for every 6.5 ns. In another example, if the SYS ToD has a reference clock signal frequency period of 2 ns with a counter increment value of 2 added to each period, the counter increment value of the system counter 118 at 10 ns can be 10. In this example, if the PHY counter 124 can have a counter value 13 at 10 ns, the PHY counter 124 may add the additional counter increment value of 3 to one period within the 10 ns.

By utilizing the clock frequency of the system RC generator 116, a fixed counter increment value in the system domain 110 can be added for each period defined by the clock frequency of the system RC generator 116. For example, in each period of the system RC generator 116, a certain increment value of the system counter 118 can be added to the SYS ToD. The counter increment value may be matched with the "nominal period" of the RC generator 116. For example, if the "nominal" period is 2 ns, the system counter 118 may fix the increment value to 2. Then, the system RC generator 116 can change its reference clock period from 2 ns to 1.9 ns, or 2.1 ns, while keeping the increment value as 2. Thus, the system counter 118 can synchronize its ToD to the ToD received from a master network device. For example, if the period of a reference clock signal generated by the system RC generator 116 is 6.5 ns, a counter increment value of 6.5 can be added for each period of 6.5 ns. In another example, if the reference clock frequency of the system RC generator 116 is 2 ns, counter increment values can be added, such that if the ToD timestamp provides that the counter increment value at 10 ns is 10, the counter increment value of 2 can be added for every 2 ns, so that the counter increment value at 10 ns can be synchronized with the ToD timestamp.

In some embodiments, a time of a network device can be synchronized with a reference time received from a master network device in a system domain 110 of the network device. The synchronized time can be transferred to a PHY domain 120 implemented in the physical layer of the network device. The transferring of the synchronized time between the system domain 110 and the PHY domain 120 can cause an error, such as a time difference between the system domain 110 and PHY domain 120 of the network device. The flexible PTP system 100 can be configured to synchronize the time in both the system domain 110 and PHY domain 120.

Although embodiments disclosed herein may be related to network devices with an Ethernet port, any suitable principles and advantages disclosed herein can be applied to other ports that can physically connect network devices, such as USB ports, PCI ports, or the like.

Figures 2A, 2B:
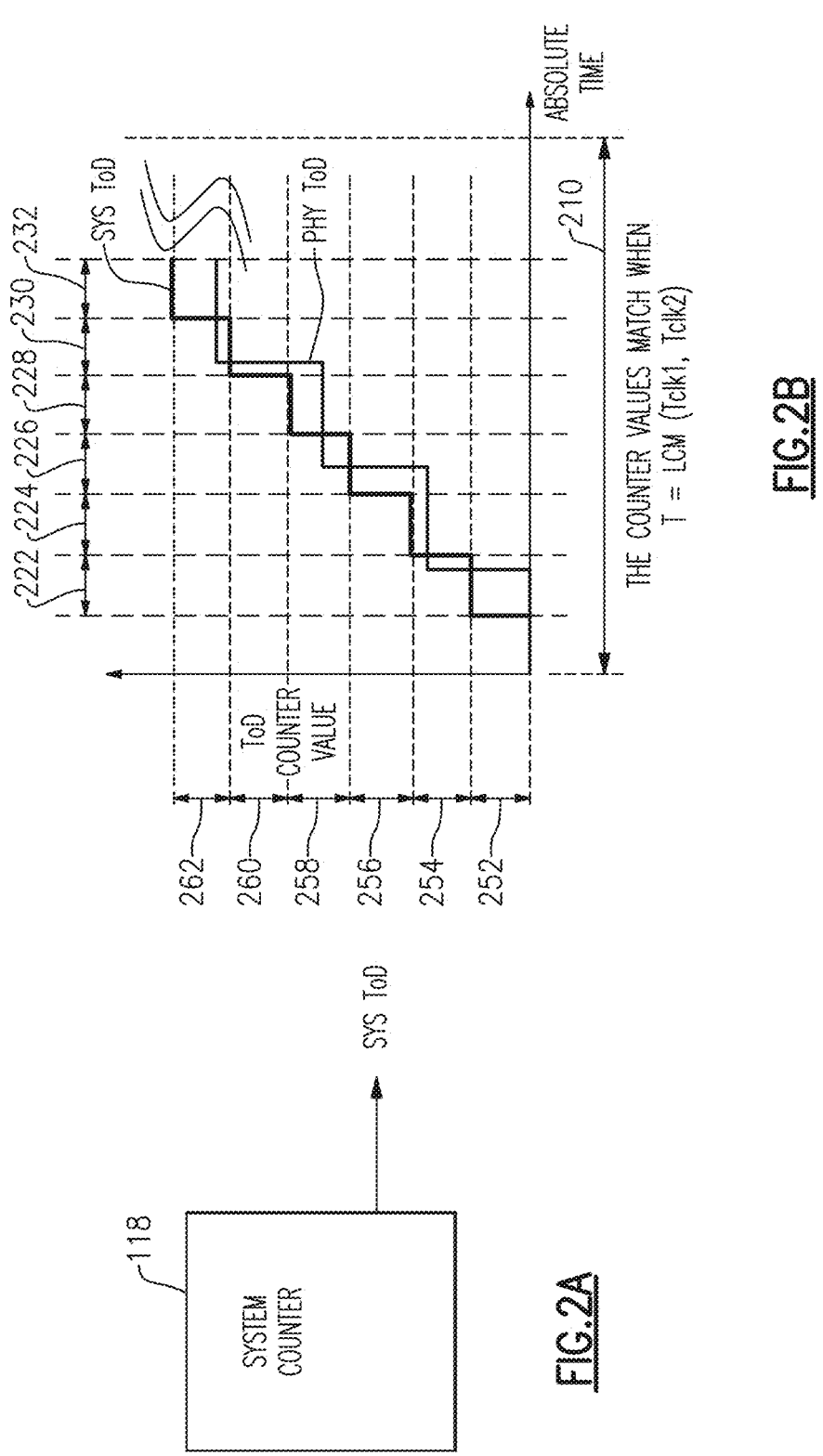
FIG. 2A is an example of block diagram of a Time of Day (ToD) counter according to an embodiment.
FIG. 2B is a graph showing an example of a precision time protocol (PTP) ToD being modulated by the PTP protocol.

FIG. 2A is a block diagram of the system counter 118. The system counter 118 can be utilized in the system domain 110. The system counter 118 can receive a reference clock from the system RC generator 116 and generate the SYS ToD. The system counter 118 can generate a SYS phase indicator. The SYS phase indicator can be utilized to detect an error that can be referred to as an independent error between the ToDs in system domain and the PHY domain.

FIG. 2B is a graph of an example of SYS ToD and the PHY ToD that shows that the counter increment values for the system counter 118 and the PHY counter 124 are increasing in a period defined by the system RC generator 116 and PHY RC generator 126, respectively. As shown in FIG. 2B, when SYS ToD clock period is not modulated, and when PHY ToD increment value is not modulated, the counter values for the SYS ToD and the PHY ToD can overlap at a certain time, which can be referred to as a least common multiple (LCM). The LCM value can be determined based on the nominal period of the SYS ToD and the PHY ToD. For example, if the SYS ToD has a period of 2 ns and the PHY ToD has a period of 6.5 ns, the LCM value can be 26 ns. In this example, at every 26 ns, indicated by reference numeral 210, the SYS ToD and the PHY ToD may have a same counter value.

As shown in FIG. 2B, the system counter 118 may has a counter increment value matched with a nominal modulation frequency. The modulation frequency can be determined by the system RC generator 116. For example, the SYS ToD can have time periods 222, 224, 226, 228, 230, 232. These time periods can be determined by the system RC generator 116. In this example, the time periods 222, 224, 226, 228, 230, and 232 are the period of the modulated frequency. Thus, these time periods are based on the modulated frequency of the system counter 118. Further, in this example, each period of the SYS ToD counter values 252, 254, 256, 258, 260, and 262 can have a same period.

Figures 3A, 3B:
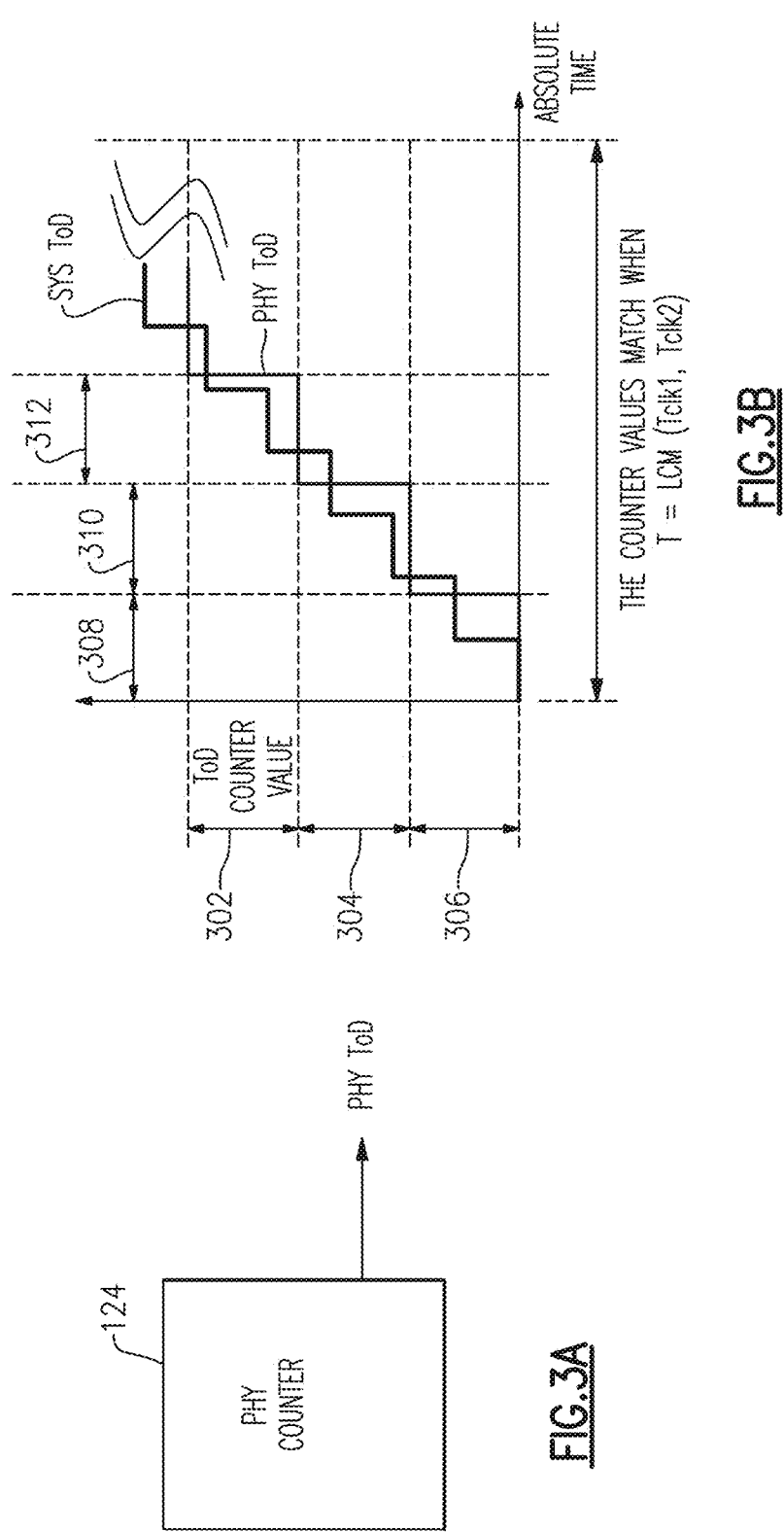
FIG. 3A is an example of a block diagram of a physical layer (PHY) counter according to an embodiment.
FIG. 3B is a graph showing an example of synchronizing a PHY ToD to a PTP ToD.

FIG. 3A is a block diagram of the PHY counter 124. The PHY counter 124 can be utilized in the PHY domain 120. The PHY counter 124 can generate the PHY phase indicator. The PHY phase indicator can be utilized to detect an error that can be referred to as an independent error between the system domain and PHY domain.

FIG. 3B is a graph of an example of the SYS ToD from the system counter 118 and the PHY ToD from the PHY counter 124. In this example, the SYS ToD and the PHY ToD are increasing in a period defined by the system RC generator 116 and PHY RC generator 126, respectively.

As shown in FIG. 3B, the SYS ToD and the PHY ToD may have a same counter value at the LCM time of the periods defined in the system RC 116 and the PHY RC 126. For example, when the reference clock period in the system domain and the increment value in the PHY domain are nominal, the SYS ToD and PHY ToD should be matched at the LCM time.

The PHY counter 124 may synchronize the PHY ToD to the SYS ToD by adjusting the counter increment values 302, 304, 306. For example, as shown in FIG. 3B, each time period 308, 310, 312 of the PHY ToD can have a counter increment value 306, 304, 302, respectively. The PHY counter 124 can adjust the ToD increment values 302, 304, 306 for one or more of the time periods 308, 310, 312, respectively. Adjusting the counter increment value for the PHY counter 124 can synchronize the PHY ToD with the SYS ToD. The time periods 308, 310, 312 can be fixed time periods for updating the PHY ToD. This can be a result of the PHY RC generator 126 having a fixed clock frequency.

As discussed above, the flexible PTP system 100 can synchronize the ToD by utilizing PTP in the system domain 110 and the PHY domain 120. In the system domain 110, the SYS ToD can be generated, and the SYS ToD can be transferred to the PHY domain 120. During this domain transfer, a time error can be generated such as a time delay. Due to this time error, the counters for generating the SYS ToD and PHY ToD may not be synchronized.

Figures 4A, 4B:
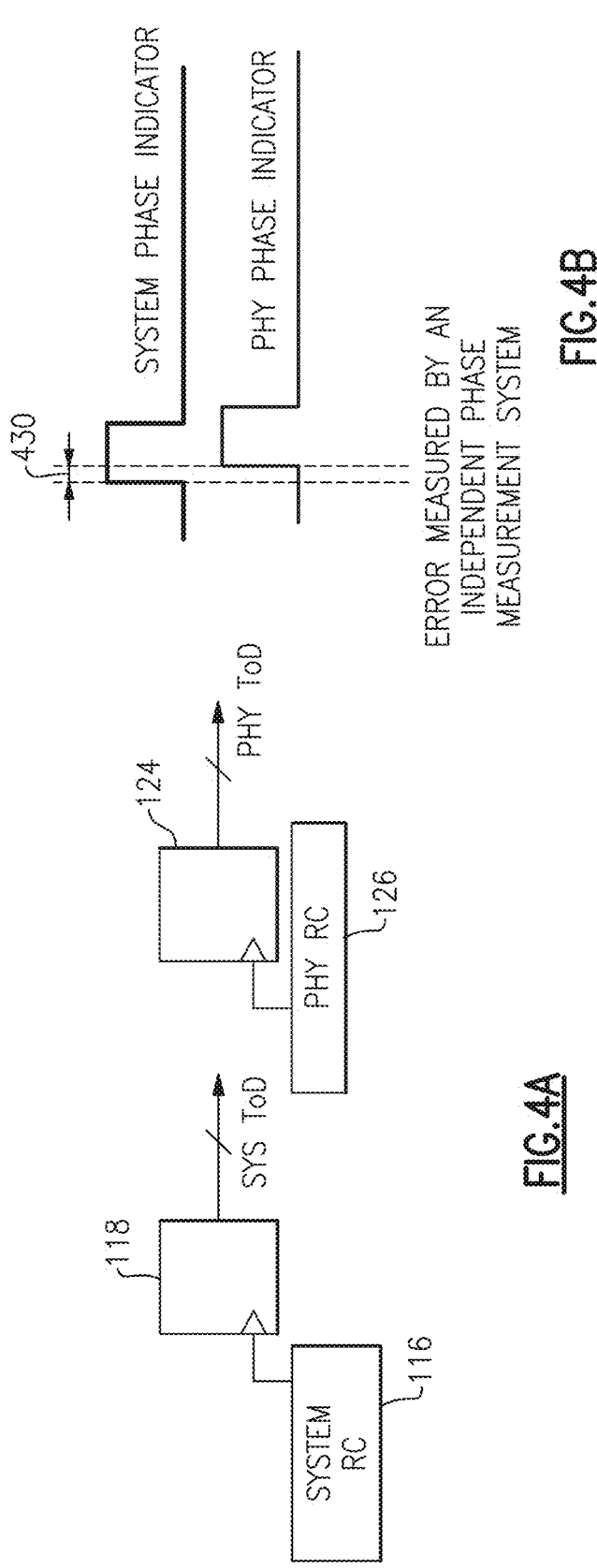
FIG. 4A is a block diagram of a PTP ToD counter and a PHY ToD counter according to an embodiment.
FIG. 4B illustrates an example of clock signals generated from the SYS ToD counter and the PHY ToD counter according to an embodiment.

The time error caused by the domain transfer can be determined by utilizing the flexible PTP system 100. FIG. 4A is a block diagram of the system counter 118 and the PHY counter 124. The system counter 118 can be implemented in the system domain 110, and the PHY counter 124 can be implemented in the PHY domain 120. In certain applications, the system domain 110 and PHY domain 120 can have different reference clock signals. For example, the system domain 110 may include the system RC generator 116, and the PHY domain 120 can include the PHY RC generator 126 that generate different reference clocks having different respective frequencies. These different RCs in the system domain 110 and the PHY domain 120 can cause the time error in the ToDs in these two clock domains. For example, the system counter 118 may synchronize the SYS ToD with the ToD received from a master network device in the system domain 110 by adjusting the reference clock frequency generated from the system RC generator 116. However, the reference clock frequency in the PHY domain 120 can be different from the reference clock frequency in the system domain 110. This difference can generate the ToD difference in these domains.

To synchronize the ToD in the system domain and the PHY domain, an actual error can be calculated based on signals associated with the system counter 118 and the PHY counter 124. The actual error can be based on (1) an independent phase error associated with differences in the ToDs in the system domain and the PHY domain 120 at the time of LCM and (2) a residual error associated with the PHY ToD counter in the PHY domain. Referring to FIG. 4A, the residual error can be determined by calculating a fractional error on the PHY ToD. For example, any non-integer physical ToD counter increment value at the LCM can be the residual error.

FIG. 4B is a graph associated with the independent error measurement. The independent error can be measured by comparing the SYS phase indicator and the PHY phase indicator in a certain time period. The period can be a sync period or the least common multiple increment values of the modulated time periods utilized in the system domain 110 and the PHY domain 120. For example, the system counter 118 can generate the SYS phase indicator as a pulse at each nanosecond-to-second rollover event. In this case, the phase indicator will have a period of one-pulse-per-second (1PPS). As another example, the system counter 118 can also generate the phase indicator as a high bit in the nanoseconds field (e.g., bit 26 of the 32-bit field). The PHY counter 124 can also generate the PHY phase indicator during the same period as the period in which the SYS phase indicator is generated. A phase difference between the SYS phase indicator and the PHY phase indicator can be an independent error. A measurement circuit can compute such a difference based on these phase indicators.

The residual can be generated by changing the increment value of the PHY ToD. For example, if the increment value in the system domain is 2, and the increment value in the PHY domain is 6.4, then both counters will have exactly N seconds and 0 nanoseconds at the rollover events, or any other LCM time. In this example, if the increment value in the PHY domain is changed to 6.5, then the system counter 118 can still have N seconds and 0 nanoseconds, while the PHY counter 124 now can have N seconds and 0.1 nanoseconds. In this examples, the residual error can be the 0.1 ns. In another example, if the SYS and PHY phase indicators are generated as 1PPS, then the residual will be any non-zero nanosecond of the PHY ToD at the nanosecond-to-second rollover event. If the SYS and PHY phase indicators are generated as bit 26, then the residual will be any non-zero value in field below bit 26 (bits 25:0).

In certain applications, a flexible PTP system can determine an actual error in synchronizing a time between the system domain and the PHY domain of the flexible PTP system. For example, the flexible PTP system may perform a timing synchronization between the ToD in system domain and ToD timestamp received from a master network device or a GPS transmitter. An independent error can include a time or phase difference caused by clock domain transfer. After determining the independent error, the flexible PTP system may perform another time synchronization to synchronize the PHY ToD to the SYS ToD based on the error measurement and a residual in the PHY counter that generates the PHY ToD. An actual error of a flexible PTP system can be calculated based on the independent error and the residual error. For example, the actual error can be calculated from the independent error by subtracting the residual error.

Figure 5:
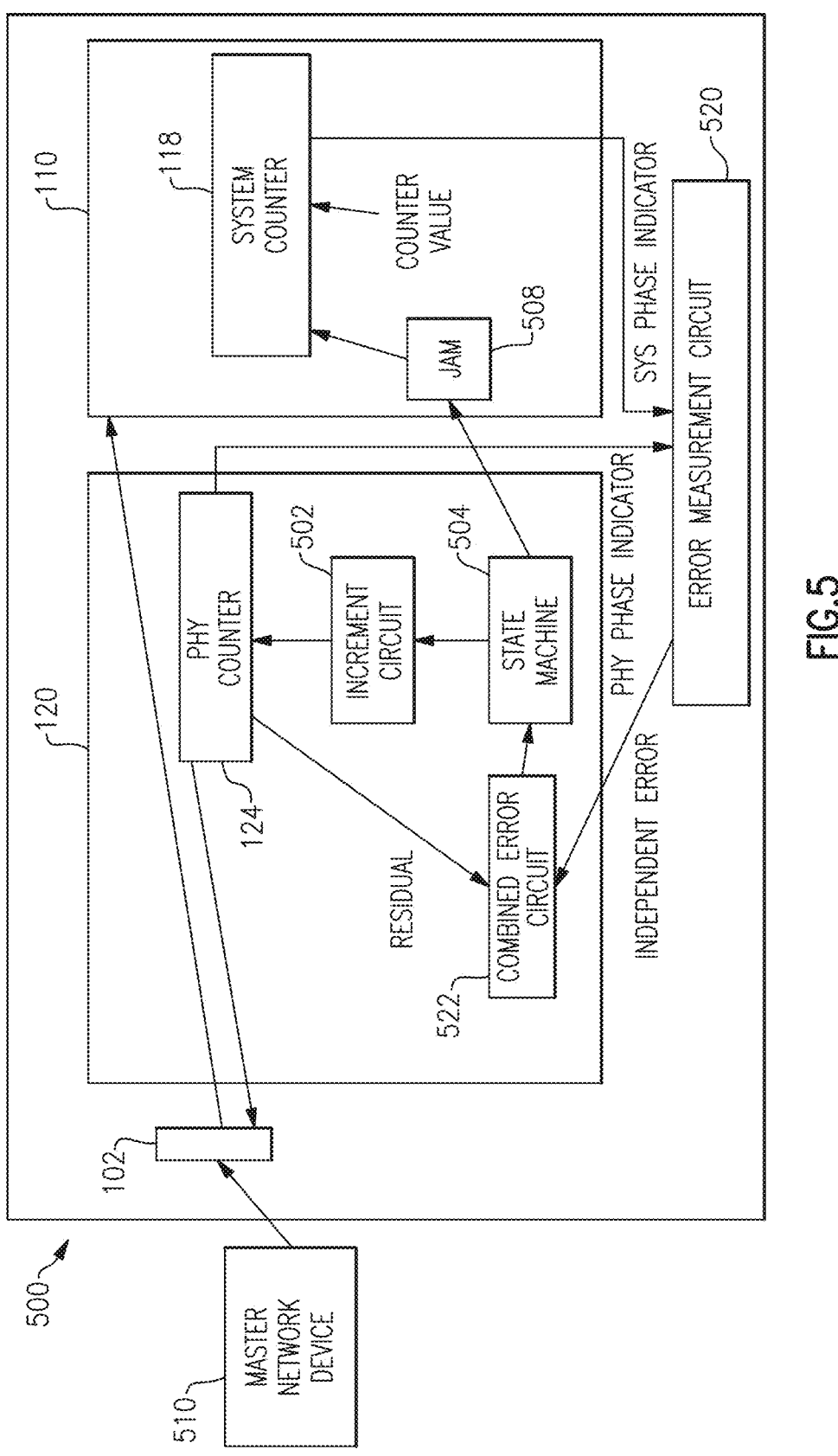
FIG. 5 is a block diagram of an example flexible PTP system with an error measurement circuit according to an embodiment.

FIG. 5 is a block diagram of an example flexible PTP system 500 with an error measurement circuit 520. The flexible PTP system 500 in FIG. 5 is an example embodiment of the flexible PTP system 100 in FIG. 1 and also illustrates an error measurement circuit 520. The error measurement circuit 520 can be implemented with any suitable principles and advantages of the flexible PTP system 100 of FIG. 1. The flexible PTP system 500 can determine the actual error that is based on both the independent phase error and residual error. The error measurement circuit 520 can measure an independent error, such as a phase error representing a phase difference between the SYS ToD and the PHY ToD. The PHY domain may synchronize its ToD to the system domain by utilizing the measured independent error and the residual measured in the PHY counter 124.

As shown in FIG. 5, the flexible PTP system 500 can include a system domain 110 and a PHY domain 120. The system domain 110 can include circuitry configured to generate the SYS ToD and the SYS phase indicator. As shown in FIG. 5, an Ethernet port 102 can receive a packet including a ToD timestamp from a master network device 510. The Ethernet port 102 can provide the packet to the system domain 110. The Ethernet port 102 can alternatively or additionally receive a reference GPS time signal. The PHY domain 120 can include circuitry configured to synchronize the PHY ToD with the system ToD. The PHY domain 120 can also include circuitry configured to generate a PHY phase indicator. The flexible PTP system 500 also can include an error measurement circuit 520. The error measurement circuit 520 can be configured to detect and calculate an error (e.g., ToD difference) between SYS ToD and PHY ToD. For example, the error measurement circuit 520 may compare the SYS phase indicator and the PHY phase indicator to detect the independent error.

The error measurement circuit 520 can be configured to receive input from the PHY domain 120 and an input from the system domain 110. These inputs can be indicative of phase of the ToDs in both domains. For example, a PHY counter 124 in the PHY domain 120 may provide a PHY phase indicator, and the system counter 118 may provide a SYS phase indicator to the error measurement circuit 520. The PHY phase indicator can be generated from the PHY ToD. The SYS phase indicator can be generated from the SYS ToD. In certain implementations, the phase indicators are one bit signals and the ToDs are 80 bit signals. The error measurement circuit 520 can generate an independent measurement of phase error from the SYS phase indicator and the PHY phase indicator. For example, the error measurement circuit 520 may determine a time difference or phase difference between edges of the SYS phase indicator and the PHY phase indicator. The difference in time or phase between edges of these signals can be an error measurement output by the error measurement circuit 520.

The error measurement circuit 520 can be implemented on an integrated circuit having input contacts (e.g., pins, bumps, etc.) electrically connected to circuitry of the system domain 110 and circuitry of the PHY domain 120. The integrated circuit can be a field programmable gate array (FPGA), a system on a chip (SOC), a processor, or the like. The integrated circuit can include a circuit having a high frequency, such as a frequency in a range from 8 gigahertz to 12 gigahertz. Such a circuit can be used to determine a phase difference between ToDs with high resolution. In certain applications the integrated circuit can include a circuit having a frequency of about 10 gigahertz. The circuit with a frequency of about 10 gigahertz can be used to detect a phase difference between ToDs of about 100 picoseconds. The input contacts of the integrated circuit that includes the error measurement circuit 520 can receive indications of phase of the ToD in the system domain 110 and the PHY domain 120.

The system domain 110 can include a system counter 118 configured to provide a SYS ToD. A counter increment value can be provided to the system counter 118 to be added for each period. The counter increment value in the system domain 110 can be a fixed counter increment value. For example, if the counter increment value is 2, the system counter 118 output value can be increased by 2 for each period of the system RC.

The system domain 110 can adjust the period of the system counter 118 to synchronize the system ToD with the ToD received from the master network device 510. For example, if the SYS ToD increases too fast, the system RC generator 116. counter 118 increments its output value with a longer time period. This adjustment can match the SYS ToD to a mater network device's ToD.

The PHY domain 120 can include a PHY counter 124 that provides the current PHY phase indicator as an output. A counter increment value may be added for each period until the time periods reach a certain time. The clock frequency of the PHY RC can be fixed.

The PHY counter 124 can adjust an increment value of the added to the PHY ToD one or more periods of the PHY RC. An increment circuit 502 can provide the increment value to the PHY counter 124. The added counter increment value can be determined based on the error measurement provided by the error measurement circuit 520. A state machine 504 can receive an error signal indicative of the error measurement from the error measurement circuit 520. The error signal can also be indicative of a residual measured in the PHY counter 124. The state machine 504 can determine the increment value based on the error measurement and the residual so as to reduce error. If the state machine 504 determines that there is an error, the state machine 504 can cause the increment circuit 502 to update the increment value for the PHY counter 124. The increment value can be a phase adjustment signal indicative of the error measurement and the residual. This can reduce and/or eliminate the phase difference between the PHY ToD and the SYS ToD.

In certain examples, the flexible PTP system 500 may initiate the timing synchronization by determining the independent error at the error measurement circuit 520. For example, with reference to FIGS. 4A and 4B, the error measurement circuit 520 can compare the SYS phase indicator and PHY phase indicator (or indicators thereof) and determine the independent error. This can involve a comparison of edges of these signals. The independent error can be combined with a residual error to determine increment counter values for the PHY counter 124 using a combined error circuit 522. The state machine 504 can determine an increment counter value. The residual can be measured in the PHY counter 124, such that a counter value at the LCM that is not divisible by the nominal increment value. The combined error circuit 522 can combine the independent error and the residual. The combined error can be provided to the state machine 504. In some instances, if the combined error is larger than a threshold value, the combined error circuit 522 can provide the combined error to the state machine 504. After receiving the combined error from the combined error circuit 522, the state machine 504 can determine an increment value to align the PHY ToD with the SYS ToD. The increment value determined by the state machine 504 can be provided to the increment circuit 502. The increment circuit 502 can apply the increment value to the PHY counter 124. An error flag can be provided to the jam circuit 508 of the system domain 110 when the combined error is greater than a certain threshold. The jam circuit 508 can trigger a quick step correction.

Timing synchronization can be performed in the system domain 110 and PHY domain 120 according to one or more embodiments. Timing synchronization in the system domain 110 can be relative to timing in a master device. For example, the system domain receives ToD timestamp from a master network device and synchronizes the system ToD with the received ToD timestamp. In the system domain 110, the counter value for the system counter 118 can be fixed to a nominal period of the system RC generator 116. Timing in the PHY domain 120 can be relative to the system domain 110. In the PHY domain 120, the increment circuit 502 can adjust counter increment value of the PHY counter 124 to synchronize the PHY ToD with the SYS ToD, for example, as described in the above.

Figure 6:
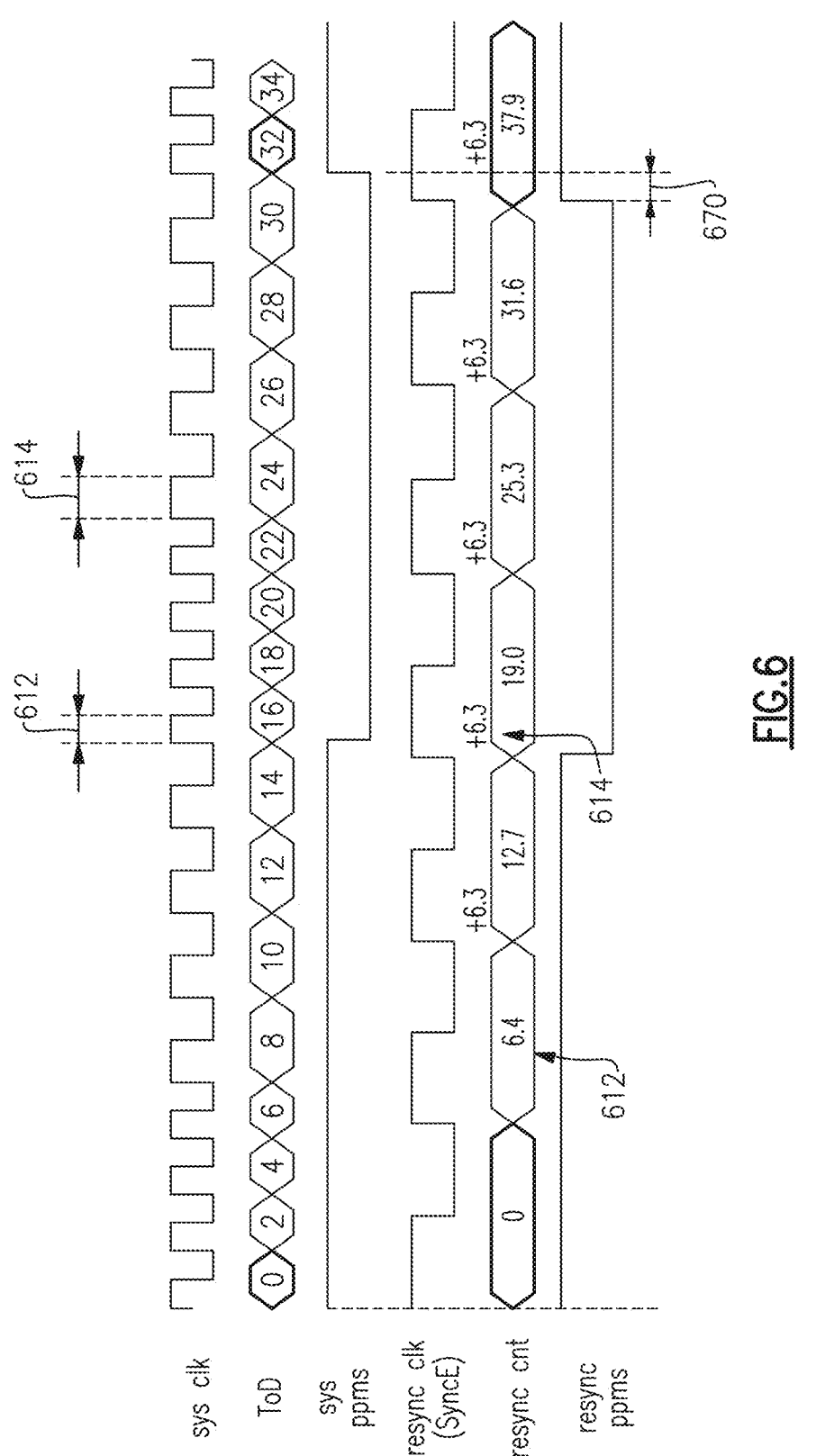
FIG. 6 illustrates an example of detecting an actual error by using clock signals generated from the SYS ToD counter and PHY ToD counter.

FIG. 6 is a graph associated with an example of detecting an actual error by using clock signals generated from a system counter and a PHY counter. A system clock signal sysclk can be generated by a system RC generator. A ToD can be the ToD in the system domain. Other signals and values shown in FIG. 6 include the sys ppms, the PHY RC resync clk, a resync cnt that can correspond to a PHY ToD, and a PHY sync, resync ppms. The sys ppms and resync ppms are provided as examples of phase indicators.

The independent error can be measured based on the sys ppms and the resync ppms signals. The independent measurement can be performed in accordance with any suitable principles and advantages disclosed herein, for example, as discussed with reference to FIGS. 4A and 4B. As shown in 6, the independent error can be measured as 5.9 by determining the difference 670.

The ToD and the resync cnt signals can be synchronized at ToD value of 32 and resync cnt value of 37.9. Assuming that the phase indicators are generated at LCM=32, such that whenever the counters cross the values 0, 32, 64, 96, etc, the residual error can be calculated as 5.9. Thus, the actual error, as shown in FIG. 6 can be calculated by subtracting the independent error from the residual error, such that subtracting the width of difference 670 from the 5.9 (residual error calculated from the resync ppms, 37.9-32).

The resync cnt signal can be controlled so that it is synchronized with the ToD by adjusting an increment value for a PHY counter. For example, in the first period the added counter increment value is 6.4, and the counter increment value is adjusted to 6.3 in a subsequent time period. The resync clk in this example is unchanged.

Figure 7:
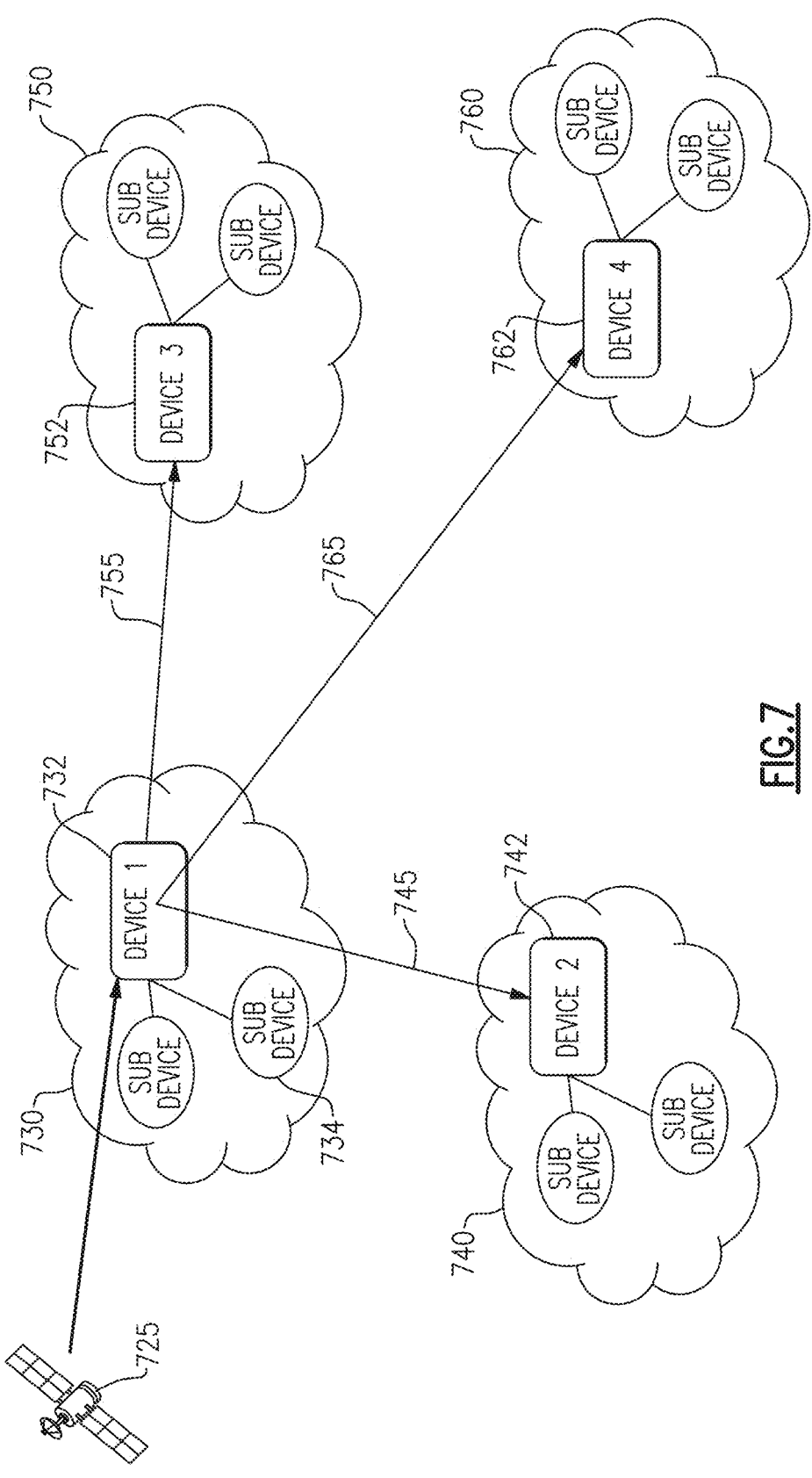
FIG. 7 is an example of network devices with timing synchronization included in a network.

The flexible PTP systems disclosed herein can be implemented in various types of network topologies. FIG. 7 is an example of network topology that can use the flexible PTP systems according to one or more embodiments as disclosed herein. The network illustrated in FIG. 7 can include a plurality of devices 732, 742, 752, 762. As illustrated, a first device 732, can be referred to as a master device and connected to a second device 742, a third device 752, and a fourth device 762, where the second, third, and fourth devices 742, 752, 762, respectively, can each be referred to a slave device. The communication paths, a first path 745, a second path 755, and a third path 765, can be used to connect the first device 732 (master device) to the second, third, and fourth devices 742, 752, 762 (slave devices). The communication paths 745, 755, 765 can be an Ethernet-based paths or any other suitable communication paths.

As shown in FIG. 7, the first device, 732, may receive a reference time signal from a satellite 725. The first device 732 can transmit a reference time signal to the second, third, and fourth devices 742, 752, 762 in a packet. The reference time signal can be a ToD timestamp. After receiving the reference time signal from the first device 732, each of the second, third, and fourth devices 742, 752, 762, can synchronize their time with the reference time signal. The flexible PTP systems disclosed herein can be implemented in one or more of the first, second, third, and fourth devices 732, 742, 752, 762 to synchronize the time according to one or more embodiments disclosed herein. For example, the flexible PTP system may determine an error by utilizing the reference time in the system domain and PHY domain. The time signal in system domain can be represented as a system ToD, and the time signal in PHY domain can be represented as a PHY ToD. The flexible PTP system can be configured to synchronize the PHY ToD to the system ToD by detecting error and compensating for the error according to one or more embodiments as disclosed herein.

As shown in FIG. 7, each of the first, second, third, and fourth devices 732, 742, 752, 762, can form a local area network (LAN) by connecting with sub-devices 734. For example, the local area networks (LANs) 730, 740, 750, 760 are formed by connecting the first, second, third, and fourth devices 732, 742, 752, 762, respectively, to sub-devices 734. In this example, each of the first, second, third, and fourth devices 732, 742, 752, 762 can be a master device and the sub-devices 734 connected to the device can be a slave device, and one or more slave devices can include the flexible PTP system to synchronize the time with the first, second, third, and fourth devices 732, 742, 752, 762.

Figure 8:
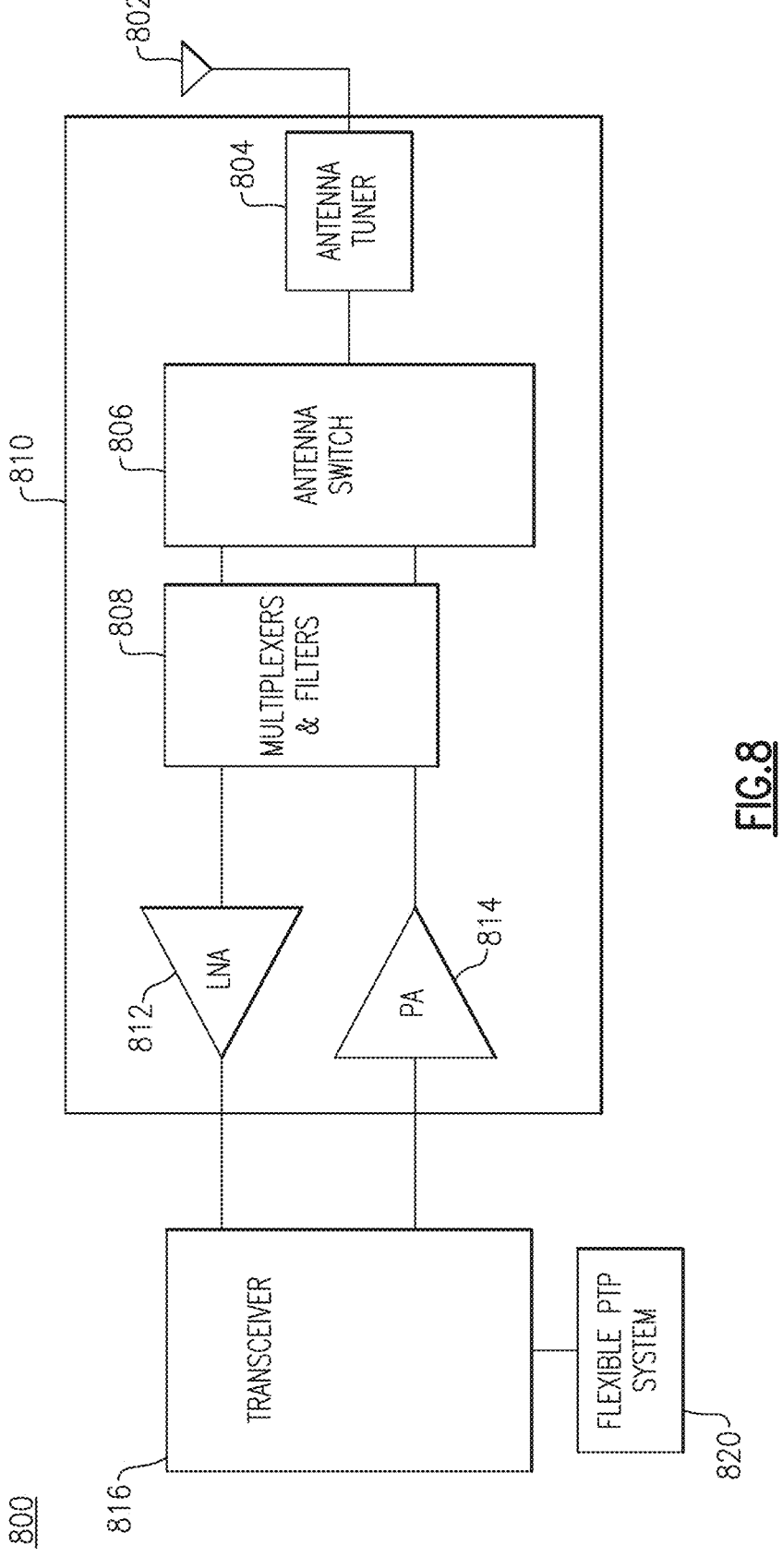
FIG. 8 is an example diagram for utilizing a flexible precision time protocol system in a mobile device.

The flexible PTP systems disclosed herein can be implemented in a wireless communication devices, such as mobile devices. FIG. 8 is a block diagram of one embodiment of a mobile device 800. The mobile device 800 can include a flexible PTP system in accordance with any suitable principles and advantages disclosed herein. The mobile device 800 can include a flexible PTP system 820. The flexible PTP system 820 can be implemented in accordance with any suitable principles and advantages disclosed herein. The flexible PTP system 820 can synchronize the reference time in devices throughout a network. The flexible PTP system 820 can be integrated with and/or included in ta transceiver 816. In some instances, the flexible PTP system 820 and/or any other flexible PTP systems disclosed herein can be a stand-alone integrated circuit (IC). In some instances, the flexible PTP system 820 can be implemented in circuitry such as baseband circuitry (not shown in FIG. 8). The arrangement of the flexible PTP system 820 can be implemented in any suitable device based on specific applications.

As illustrated in FIG. 8, the mobile device 800 can include a RF front end system 810 that can be used for a wireless communication using a wide variety of communications technologies, including, but not limited to, second generation (2G), third generation (3G), fourth generation (4G) (including Long Term Evolution (LTE), LTE-Advanced, and LTE-Advanced Pro), fifth generation (5G) New Radio (NR), wireless local area network (WLAN) (for instance, WiFi), wireless personal area network (WPAN) (for instance, Bluetooth and ZigBee), WMAN (wireless metropolitan area network) (for instance, WiMax), Global Positioning System (GPS) technologies, or any suitable combination thereof. The illustrated flexible PTP system 820 can include electrical components in accordance with any suitable combination of features disclosed herein. The flexible PTP system 820 can receive a time of day (ToD) timestamp through one or more signal paths to an antenna 802. The ToD signal can be a clock signal or enclosed in a data packet received from another network device, such as a master network device. The flexible PTP system 820 can precisely synchronize the time of the mobile device 800 with a reference time (e.g., a time signal or time stamp received from a master network device). Once the time is synchronized with the reference time, the mobile device 800 can distribute the synchronized time to other network devices.

The RF front end system 810 shown in FIG. 8 can include additional circuitry such as an antenna tuner 804, an antenna switch 806, duplexers and filters 808, a low noise amplifier 812, and a power amplifier 814. The antenna tuner 804 can be connected to an antenna 802 and performs an impedance matching between the RF front end system 810 and the antenna 802 to improve power transfer between the RF front end system 810 and the antenna 802. For example, selecting one RF signal path using the antenna switch 806 may change the impedance of the RF front end system 810. The antenna tuner 804, then, matches the impedance of the RF front end system 810 and the antenna 802. The antenna switch 806 can be used to selectively electrically connect the antenna 802 to one or more RF signal paths. Such RF signal paths can include at least a filter and an RF amplifier. The antenna switch 806 can be a multi-throw radio frequency switch. The antenna switch 806 can electrically connect the antenna 802 to different RF signal paths for different operating frequency bands and/or different power modes. Other RF circuit elements, such as multiplexers and filters 808, a low noise amplifier 812, and a power amplifier 814 aids in processing signals transmitted to and/or received from the antenna 802. For example, the other RF circuit elements can provide a number of functionalities, including, but not limited to, amplifying signals for transmission, amplifying received signals, filtering signals, duplexing of signals, frequency domain multiplexing of signals (for instance, diplexing or triplexing), phase shifting of signals, or any suitable combination thereof. The transceiver 816 generates RF signals for transmission and processes incoming RF signals received from the antenna 802.

The transceiver 816 generates RF signals for transmission and processes incoming RF signals received from the antenna 802 and processed by the RF front end system 810. In some instances, the mobile device 800 includes a plurality of antennas. It will be understood that various functionalities associated with the transmission and receiving of RF signals can be achieved by one or more components that are collectively represented in FIG. 8 as the transceiver 816. In one example, separate components (for instance, separate circuits or dies) can be provided for handling certain types of RF signals.

FIG. 8 is an example system that can use the flexible PTP system in synchronizing the time of the mobile device in a communication network. It will be understood that various types of RF front end system, antenna, and transceiver can be used and that various functionalities associated with the transmission and receiving of RF signals can be achieved by one or more components in FIG. 8 or by adding an additional circuitry based on a specific application.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a hand-held computer, a laptop computer, a tablet computer, a home appliance, a vehicular electronics system such as an automotive electronics system, a robot such as an industrial robot, an Internet of things device, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description is not intended to be exhaustive or to limit the embodiments of the disclosure to the precise form disclosed above. While specific embodiments and examples are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of clock domain timing synchronization, the method comprising:

receiving a Time of Day timestamp from a master network device;

adjusting clock period in a first clock domain of a slave network device such that an output of first Time of Day Counter is synchronized to the Time of Day timestamp; and synchronizing an output of a second Time of Day counter in a second clock domain of the slave network device to the output of the first Time of Day counter based on (1) an error measurement representing a phase difference between outputs of the first and second Time of Day counters and (2) a residual measured in the second Time of Day counter.

2. The method of claim 1 wherein the act of synchronizing the output of the second Time of Day counter includes adjusting an increment value of the second Time of Day counter.

3. The method of claim 2 wherein a state machine is configured to determine the increment value of the second Time of Day counter the second Time of Day counter receives a clock signal having a fixed frequency.

4. The method of claim 2 wherein the first Time of Day counter has a fixed increment value.

5. The method of claim 2 wherein the second Time of Day counter receives a clock signal having a fixed frequency.

6. The method of claim 1 wherein the first Time of Day counter and the second Time of Day counter receive different clock signals having different respective frequencies.

7. The method of claim 1 wherein the first clock domain is a system domain and the second clock domain is a physical layer domain.

8. The method of claim 1 wherein the act of receiving is performed using an Ethernet port of the slave network device.

9. The method of claim 1 further comprising generating the error measurement with an error measurement circuit that is on an integrated circuit having a first input contact configured to receive a phase indicator from the first Time of Day counter and a second input contact configured to receive a phase indicator from the second Time of Day counter.

10. The method of claim 1 further comprising determining the Time of Day from a packet received from the master network device using a timestamp filter.

11. A network device comprising:

a port configured to receive a Time of Day timestamp from a master network device;

first clock domain circuitry including a first Time of Day counter and a reference clock generator, the reference clock generator configured to adjust a reference clock signal based on the Time of Day timestamp to synchronize an output of the first Time of Day counter to the Time of Day timestamp; and second clock domain circuitry including a second Time of Day counter and a state machine, the state machine configured to synchronize an output of the second time of Day counter to the output of the first Time of Day counter based on (1) an error measurement representing a phase difference between outputs of the first and second Time of Day counters and (2) a residual measured in the second Time of Day counter.

12. The network device of claim 11 wherein the state machine is configured to adjust an increment value of the second Time of Day counter based on the error measurement and the residual.

13. The network device of claim 11 wherein the first Time of Day counter has a fixed increment value.

14. The network device of claim 11 wherein the second clock domain circuitry includes a second reference clock generator configured to generate a second reference clock signal having a fixed frequency, and the second Time of Day counter is configured to receive the second reference clock signal.

15. The network device of claim 11 wherein the second clock domain circuitry includes a second reference clock generator configured to generate a second reference clock signal having a different frequency than the reference clock signal.

16. The network device of claim 11 further comprising an error measurement circuit configured to generate the error measurement.

17. The network device of claim 16 wherein an integrated circuit includes the error measurement circuit, and the integrated circuit includes a first input contact configured to receive an indication of phase of the output of the first Time of Day counter and a second input contact configured to receive an indication of phase of the output of the second Time of Day counter.

18. The network device of claim 11 wherein the port is an Ethernet port.

19. The network device of claim 11 wherein the first clock domain circuitry includes a timestamp filter configured to determine the Time of Day timestamp from a packet received from the master network device at the port.

20. A clocking system comprising:

first clock domain circuitry including a first Time of Day counter and a reference clock generator, the reference clock generator configured to adjust a reference clock signal based on a Time of Day timestamp to synchronize an output of the first Time of Day counter to the Time of Day timestamp; and second clock domain circuitry including a second Time of Day counter and a state machine, the state machine configured to synchronize an output of the second time of Day counter to the output of the first Time of Day counter based on (1) an error measurement representing a phase difference between outputs of the first and second Time of Day counters and (2) a residual measured in the second Time of Day counter.

* * * * *